US009429129B2

(12) United States Patent
Krittian et al.

(10) Patent No.: US 9,429,129 B2
(45) Date of Patent: Aug. 30, 2016

(54) HYDROSTATIC POWER UNIT TO START AN INTERNAL COMBUSTION ENGINE

(71) Applicant: Linde Hydraulics GmbH & Co. KG, Aschaffenburg (DE)

(72) Inventors: Lukas Krittian, Aschaffenburg (DE); Martin Steigerwald, Glattbach (DE); Martin Oberhausser, Aschaffenburg (DE); Alfred Langen, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 254 days.

(21) Appl. No.: 14/082,358

(22) Filed: Nov. 18, 2013

(65) Prior Publication Data

US 2014/0208733 A1 Jul. 31, 2014

(30) Foreign Application Priority Data

Nov. 22, 2012 (DE) ........................ 10 2012 111 299

(51) Int. Cl.

| | |
|---|---|
| ***F16D 31/02*** | (2006.01) |
| ***F02N 7/06*** | (2006.01) |
| ***F15B 1/24*** | (2006.01) |
| ***F02N 7/00*** | (2006.01) |
| ***F02N 19/00*** | (2010.01) |

(52) U.S. Cl.

CPC . *F02N 7/06* (2013.01); *F02N 7/00* (2013.01); *F02N 19/001* (2013.01); *F15B 1/24* (2013.01)

(58) Field of Classification Search

CPC ............ F15B 1/024; F02N 7/06; F02N 7/08; F04B 17/05; F04B 35/002; F04B 49/02

See application file for complete search history.

(56) References Cited

U.S. PATENT DOCUMENTS 3,153,899 A * 10/1964 Budzich .................... F02N 7/06 417/324

FOREIGN PATENT DOCUMENTS

| | | | |
|---|---|---|---|
| DE | 2542244 | A1 | 3/1977 |
| DE | 3150533 | A1 | 7/1983 |
| DE | 102009056153 | A1 | 6/2011 |
| EP | 2308795 | A1 | 4/2011 |

* cited by examiner

*Primary Examiner* — Michael Leslie

(74) *Attorney, Agent, or Firm* — The Webb Law Firm

(57) ABSTRACT

A variable displacement hydrostatic power unit (7) is connected with an internal combustion engine (2). The power unit (7) operates as a pump to deliver hydraulic fluid to at least one consumer (V) and operates as a motor as a hydraulic starter for the internal combustion engine (2). Hydraulic fluid from a hydraulic accumulator (25) is supplied to the power unit (7) operated as a motor. The power unit (7) includes a spring device (55) which, when the internal combustion engine (2) is shut off, actuates a displacement volume control device (50) into a position with the maximum displacement volume. When the power unit (7) is actuated with hydraulic fluid from the hydraulic accumulator (25), the internal combustion engine (7) is immediately started by the power unit (7) without the need for an immediately preceding adjustment of the displacement volume control device (50) of the power unit (7).

5 Claims, 1 Drawing Sheet

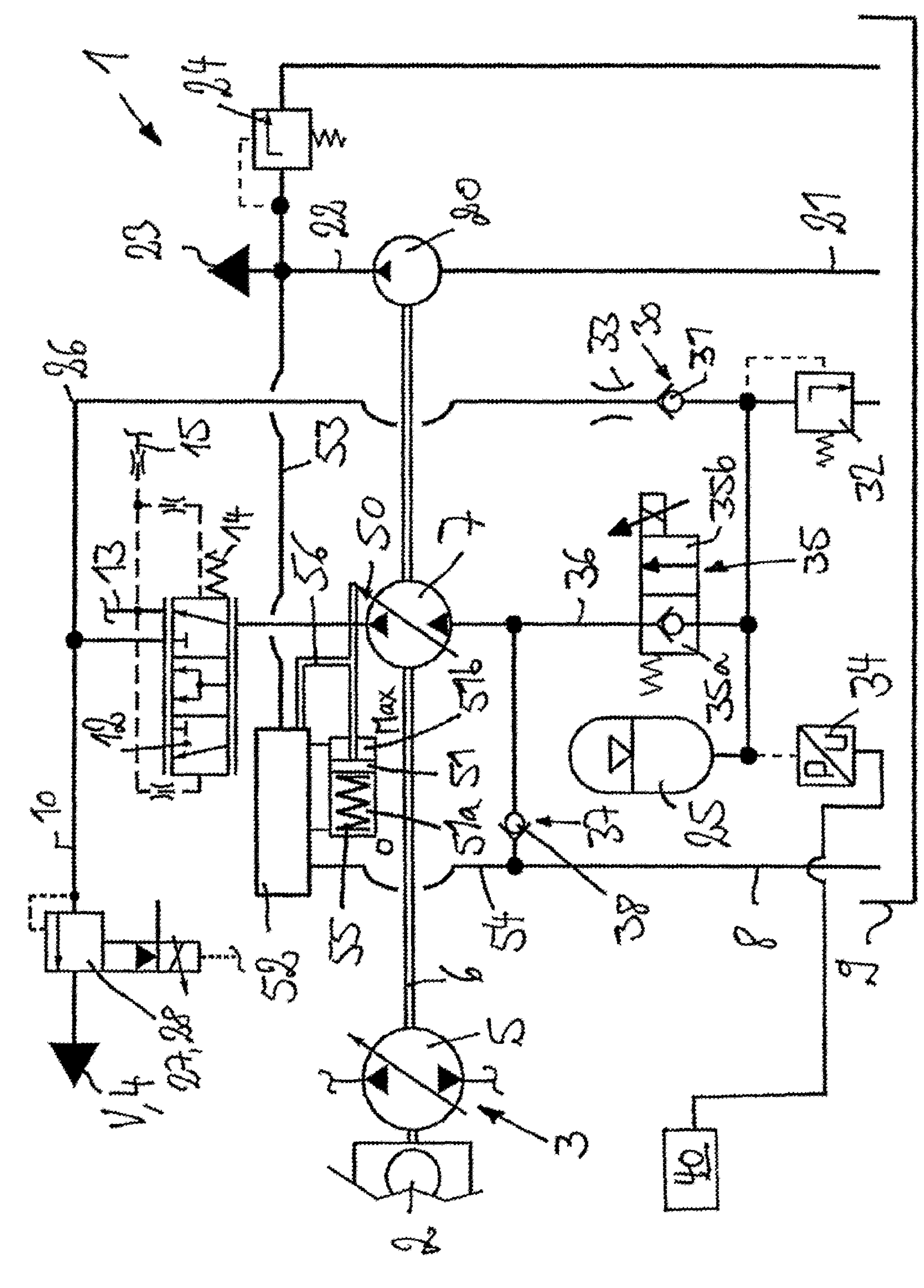

HYDROSTATIC POWER UNIT TO START AN INTERNAL COMBUSTION ENGINE

CROSS REFERENCE TO RELATED APPLICATION

This application claims priority to German Application No. 102012111299.1 filed Nov. 22, 2012, which is herein incorporated by reference in its entirety.

BACKGROUND OF THE INVENTION

1. Field of the Invention

This invention relates to a hydrostatic power unit in the form of a variable displacement machine with a continuously variable displacement volume and which can be operated as a pump and as a motor. The power unit is in a drive connection with an internal combustion engine. When operated as a pump, a suction side of the power unit sucks hydraulic fluid from a tank and delivers the hydraulic fluid into a delivery line that leads to at least one consumer. When operated as a motor, the power unit is a hydraulic starter to start the internal combustion engine, with hydraulic fluid from a hydraulic accumulator supplied to the suction side of the power unit.

2. Description of Related Art

Hydrostatic power units are known which are driven by the running internal combustion engine and which, when operated as a pump, are used to supply at least one consumer with hydraulic fluid. When operated as a motor, the power units are used as a hydraulic starter to start the shut-off internal combustion engine. These power units are used in mobile machines, such as industrial trucks, agricultural equipment, forestry equipment, and construction equipment, such as excavators, wheeled and telescoping loaders, tractors, combine harvesters, forage harvesters, and sugar beet or potato diggers, for example.

To reduce fuel consumption during pauses or interruptions in work, a start-stop function is provided for the internal combustion engine, in which the internal combustion engine, when running at no load, is shut off during pauses or interruptions in the work, and is automatically restarted when torque is requested by a work function or by the traction drive. A start-stop function of the internal combustion engine of this type can be reliably and robustly accomplished with a hydraulic starter.

EP 2 308 795 A1 describes a hydrostatic power unit which, when operated as a pump in which the power unit is driven by an internal combustion engine, sucks hydraulic fluid via a suction side out of a tank and supplies the consumer of the working hydraulics with hydraulic fluid. When operated as a motor, in which hydraulic fluid is delivered to the suction side from a hydraulic accumulator and the power unit is driven by the hydraulic fluid from the hydraulic accumulator, the power unit is used as a hydraulic starter to start the shut-off internal combustion engine.

If the power unit is a variable displacement machine with a continuously variable displacement volume, for operation as a motor the power unit must be set to a position with the maximum displacement volume to provide the output of sufficient torque required to start the internal combustion engine. From EP 2 308 795 A1 (FIG. 2), it is known that a variable displacement device which controls the displacement volume of the power unit can be connected with the hydraulic accumulator so that when the internal combustion engine is shut off, the displacement volume control device of the power unit can be actuated with the hydraulic fluid from the hydraulic accumulator. For this purpose, the hydraulic accumulator is in communication via a pressure reducer valve with a charging pressure circuit which, when the internal combustion engine is running, supplies the variable displacement device of the power unit with hydraulic fluid. A supply of this type of the variable displacement device with hydraulic fluid from the hydraulic accumulator, however, requires a great deal of extra construction effort and expense. The charge pressure circuit is connected to the hydraulic accumulator downstream of a valve device which controls the operation of the power unit as a motor by a connection between the hydraulic accumulator and the suction side of the power unit, so that the displacement volume control device is actuated with the hydraulic fluid from the hydraulic accumulator into the position with the maximum displacement volume chronologically immediately prior to the starting process of the internal combustion engine. However, on account of the setting of the displacement volume control device at the beginning of the starting process, there is a time lag in the starting process of the internal combustion engine. This has disadvantages for a start-stop function in which the starting process of the internal combustion engine must occur in a short period of time.

Therefore, it is an object of the invention to provide a hydrostatic power unit of the general type described above but which with little added construction effort or expense makes it possible to start the internal combustion engine in a shorter period of time with the power unit operating as a motor.

SUMMARY OF THE INVENTION

The invention accomplishes this object in that the power unit, which can be operated as a motor and as a pump, is provided with a spring device, by means of which, when the internal combustion engine is shut off, a displacement volume control device which controls the displacement volume of the power unit is actuated into the position with maximum displacement volume, so that when the suction side of the power unit is pressurized with hydraulic fluid from the hydraulic accumulator, the internal combustion engine starts immediately on account of the operation of the power unit as a motor without a chronologically (temporal) immediately prior adjustment of the displacement volume control device of the power unit at the beginning of the starting process of the internal combustion engine. With a spring device of this type, it is possible with little extra construction effort or expense to automatically actuate the displacement volume control device of the power unit when the internal combustion engine is shut off into the position with the maximum displacement volume. When the suction side of the power unit is pressurized with hydraulic fluid from the hydraulic accumulator to start the internal combustion engine, the power unit, by means of the spring device, is already in a position with maximum displacement volume at the beginning of the starting process of the internal combustion engine, so that the starting process of the internal combustion engine can take place immediately and no adjustment of the displacement volume control device to the maximum displacement volume is necessary at the beginning of the starting process. In connection with the spring device of the invention, when the power unit is operated as a motor, it therefore becomes easily possible and with little added construction effort or expense to start the shut-off internal combustion engine in a short period of time.

In one advantageous embodiment of the invention, the power unit is a unilaterally variable displacement power unit and the displacement volume control device of the power unit can be actuated starting from a position with minimum displacement volume in one direction of actuation. Unilaterally variable displacement power units are operated in an open circuit and make it possible to supply the connected consumers with hydraulic fluid with little extra construction effort or expense and consume very little energy when the power unit is operated as a pump. With the spring device, a power unit in the form of such a unilaterally variable displacement pump can be operated in a simple manner as a motor driven on the suction side with hydraulic fluid from the hydraulic accumulator.

In terms of achieving a simple construction, it is advantageous if, as in one preferred embodiment of the invention, the spring device is engaged on an actuator piston which is in an operative connection with the displacement volume control device. A hydrostatic power unit in the form of a variable displacement pump conventionally has an actuator piston device with which the displacement volume control device can be set and, thus, the displacement volume can be varied. The spring device of the invention can be added to such an actuator piston device in a simple manner.

In one advantageous embodiment of the invention, the actuator piston device can be pressurized with a control pressure by a control valve. When the internal combustion engine is shut off, the control pressure is removed from the actuator piston device. When operated as a pump, by a corresponding actuation of the control valve, a corresponding control pressure can be generated to pressurize the actuator piston device and, thus, to execute the corresponding setting of the displacement volume. For example, the control valve can be a load-sensing control valve, which is actuated by the load pressure of the actuated consumer, or can be an electrically actuated control valve or a high-response proportional valve.

It is particularly advantageous if the consumer is in the form of the working hydraulics of a machine and the power unit, when operated as a pump, supplies the working hydraulics with hydraulic fluid. The variable displacement pump, which is already present to supply the working hydraulics, can therefore be used in a simple manner as a hydraulic starter to start the internal combustion engine, to provide a start-stop function of the internal combustion engine.

The power unit is preferably an axial piston machine that employs a swashplate construction.

The invention further relates to a drive train of a vehicle, in particular a mobile machine, with a hydrostatic power unit of the invention driven by an internal combustion engine. The power unit, when operated as a motor, forms a hydraulic starter for the internal combustion engine and, when operated as a pump, supplies the working hydraulics of the machine with hydraulic fluid. With the hydrostatic power unit of the invention, a start-stop function can easily be achieved on a vehicle, which is characterized by the short time it takes to restart the shut-off internal combustion engine.

Additional advantages and details of the invention are described in greater detail below with reference to the exemplary embodiment illustrated in the accompanying schematic FIGURE.

BRIEF DESCRIPTION OF THE DRAWING

The accompanying FIGURE shows a schematic illustration of a drive train 1 of a mobile machine, such as an industrial truck or a piece of construction or agricultural equipment, with the hydrostatic power unit 7 of the invention.

DESCRIPTION OF THE PREFERRED EMBODIMENTS

The drive train 1 includes an internal combustion engine 2, such as a diesel engine, a traction drive 3 driven by the internal combustion engine 2, and working hydraulics 4 in the form of hydraulic consumers V driven by the internal combustion engine 2.

In the illustrated exemplary embodiment, the traction drive 3 is a hydrostatic traction drive having a variable displacement drive pump 5, which is driven by a drive connection with an output shaft 6 of the internal combustion engine 2. The drive pump 5 is in communication with one or more fixed-displacement or variable-displacement hydraulic motors in a closed circuit, which motors are in an operative connection with the driven wheels of the machine in any conventional manner.

The traction drive 3 can alternatively be an electric traction drive with an electric generator driven by the internal combustion engine 2 and one or more electric drive motors. Alternatively, the traction drive 3 can be a mechanical traction drive with a mechanical transmission, such as a multi-speed transmission, or a power split transmission, or a torque converter transmission.

The working hydraulics 4 comprise work functions of the machine, such as, on an industrial truck for example, working hydraulics for the actuation of load handling means on a lifting mast, or on a piece of construction equipment in the form of an excavator, for example, the working functions of the working equipment in the form of a shovel.

To supply the consumer V formed by the working hydraulics 4 with hydraulic fluid, the hydrostatic power unit 7, in the form of a variable displacement machine with a continuously variable displacement volume, is provided. The power unit 7 is preferably an axial piston machine employing a swashplate construction. The power unit 7 is operated in an open circuit and is driven by a drive connection with the output shaft 6 of the internal combustion engine 2.

The power unit 7, with the suction side located on the input side, is in communication by an intake line 8 with a tank 9. A delivery line 10 on the output side is in communication with the delivery side of the power unit 7 and is connected to a control valve device, by means of which the hydraulic consumers of the working hydraulics 4 can be controlled. The control valve device preferably comprises one or more directional control valves for actuation of the consumers. In the illustrated exemplary embodiment, a priority valve 12 is also shown, by means of which the priority supply of a consumer supplied by the power unit 7, such as a hydraulic steering device, can be ensured. The priority valve 12 is in communication on the input side with the delivery side of the power unit 7 and is in communication on the output side with the delivery line 10 that leads to the working hydraulics 4 and also a delivery line 13 that leads to the steering device. The priority valve 12 is controlled by a spring 14 and by the load pressure of the steering device present in a load pressure line 15.

The drive train 1 further comprises a charge pump 20, which is driven by its connection with the output shaft 6. In the illustrated exemplary embodiment, the charge pump 20 is a constant displacement pump with a constant displacement volume and is operated in an open circuit. The charge pump 20 is in communication on the suction side by means of an intake line 21 with the tank 9 and delivers into a charge pressure line 22 connected to the delivery side, to which the corresponding consumers of a charging pressure circuit 23 are connected, such as control (displacement) devices for control (adjust) of the displacement volume of the drive pump 5 and of the power unit 7, a feed device of the hydrostatic traction drive, a brake system of the vehicle, and pilot valves for the control valves of the working hydraulics 4. To protect the charge pressure in the charging pressure circuit 23, a pressure limiting device 24, such as a pressure relief valve, is operatively associated with the charge pressure line 22.

In the drive train 1 of the invention, the power unit 7 of the working hydraulics 4 is a two-quadrant power unit which can be operated as a pump and a motor in the same direction of operation and the same flow direction of the hydraulic fluid.

When operated as a pump, the power unit 7 sucks in hydraulic fluid from the tank 9 via the intake line 8 and delivers the hydraulic fluid via the priority valve 12 into the delivery line 10 of the working hydraulics 4 and/or the delivery line 13 of the steering device. When operated as a motor, the power unit 7 acts as the hydraulic starter of a start-stop function to start the internal combustion engine 2, and the power unit 7 is driven on the suction side with hydraulic fluid from a hydraulic accumulator 25.

To charge the hydraulic accumulator 25 with hydraulic fluid, the hydraulic accumulator 25 is connected by means of a hydraulic fluid line 26 to the delivery line 10 of the power unit 7 that leads to the working hydraulics 4.

Located in the delivery line 10 is an electrically actuated charging valve 27 which, when it is actuated, can be actuated into a throttling position in which it throttles the delivery line 10 to build up a pressure. The charging valve 27 is preferably a retarder valve 28 which, during the braking of the vehicle, is actuated into a throttling position so that by building up pressure in the delivery line 10, an additional decelerating torque can be impressed on the output shaft 6 (formed by the crankshaft), which counteracts the motor-torque generated by the drive pump 5 and thus decelerates the vehicle. In a braking operation of this type with a throttling retarder valve 28, it is also possible in a simple manner to recover the braking energy and charge the hydraulic accumulator, so that the kinetic energy of the vehicle during a braking process is utilized. The hydraulic fluid line 26 is connected to the delivery line 10 upstream of the charging valve 27 and therefore between the charging valve 27 and the priority valve 12.

Located in the hydraulic fluid line 26 is a shutoff valve 30, which in the illustrated embodiment is a check valve 31 that opens automatically and as a function of the pressure to allow flow to the hydraulic accumulator 25. Also operatively associated with the hydraulic fluid line 26 between the shutoff valve 30 and the hydraulic accumulator 25 is a pressure relief valve 32 to control the pressure in the hydraulic accumulator 25. Also located in the hydraulic fluid line 26 to limit the charge volume flow of the hydraulic accumulator 25 is a flow control device 33, which can be a diaphragm or throttle. The flow control device 33 can, as illustrated, be located upstream of the shutoff valve 30 or, alternatively, can be located downstream of the shutoff valve 30.

Also operatively associated with the hydraulic fluid line 26 between the shutoff valve 30 and the hydraulic accumulator 25 is a pressure sensor 34. The pressure sensor 34 monitors the charging pressure and, thus, the charge status of the hydraulic accumulator 25.

The connection of the hydraulic accumulator 25 with the suction side of the power unit 7 for the operation of the power unit 7 as a motor can be controlled by an electrically actuated control valve 35. The control valve 35 has a closed position 35*a* and an open position 35*b*, with the closed position 35*a* being preferably leak-tight with a shutoff valve that shuts off the flow to the power unit 7.

The control valve 35 is located in a branch line 36 which runs from the connecting line 26 between the shutoff valve 30 and the hydraulic accumulator 25 to the intake line 8 that leads to the suction side of the power unit 7.

Located in the intake line 8 of the power unit 7 is a shutoff valve 37 that shuts off the flow to the tank 9 and is preferably a check valve 38 that shuts off the flow to the tank 9.

An electronic control device 40 is in communication on the input side with the pressure sensor 34 and is used to actuate the charging valve 27 and the control valve 35.

To set the displacement volume, the power unit 7, in the form of a variable displacement machine with a continuously variable displacement volume, has a displacement volume control device 50, for example, a swashplate with a variable inclination of an axial piston machine that employs a swashplate construction. The displacement volume control device 50 can be actuated by an actuator piston device 51 which is in an operative connection with the displacement volume control device 50. The power unit 7 of the invention is a unilaterally variable displacement power unit, in which the displacement volume control device 50, starting from a position with a minimum displacement volume (preferably a position with a displacement volume of zero) can be displaced in one control direction or swiveling direction into a position with a maximum displacement volume.

The actuator piston device 51 has a first actuator pressure compartment 51*a* that acts in the direction of the maximum displacement volume, and a second actuator pressure compartment 51*b* that acts in the direction of the minimum displacement volume, the pressurization of which with a control pressure or their depressurization to the tank 9 can be controlled by a control valve 52. The control valve 52, for the supply of hydraulic fluid and for the generation of an actuation pressure in the actuation pressure compartments 51*a* and 51*b* by means of the branch line 53, is in communication with the charge pressure line 22 and, thus, the charging pressure circuit 23. The control valve 52 also has a connection to a tank line 54 that leads to the tank 9. The control valve 52 is preferably electrically actuated. When the internal combustion engine 2 is shut off, the actuator pressure compartments 50*a*, 50*b* of the actuator piston device 50 are depressurized. In the illustrated exemplary embodiment, the control valve 52 is in the form of a high-response proportional valve, with a mechanical feedback 56 of the actual position of the displacement volume control device 50 on the control valve 52.

To actuate the power unit 7 into the position with the maximum displacement volume when the internal combustion engine 2 is shut off, the invention teaches that there is a spring device 55 which is in an operative connection with the actuator piston device 51. When the internal combustion engine 2 is shut off, the spring device 55 actuates the displacement volume control device 50 into the position with maximum displacement volume for operation of the power unit 7 as a motor. For this purpose, the spring device 55 can be located in the actuator pressure compartment 51*a* of the actuator piston device 51.

The purpose of the spring device 55 is to guarantee that the power unit 7, when it is operated as a motor as a hydraulic starter of the internal combustion engine 2, is set to the position with maximum displacement volume when the internal combustion engine 2 is shut off. For the starting process of the internal combustion engine 2, the control valve 35 is actuated into the open position 35*b* so that the flow of hydraulic fluid out of the hydraulic accumulator 25 charged with hydraulic fluid to the suction side of the power unit 7 immediately results in the operation of the power unit as a motor and a delivery of torque by the power unit 7 into the drive train 1, because the displacement volume control device 50 is already in the position with maximum displacement volume. A separate or manual step of setting of the displacement volume control device 50 of the power unit 7 to the maximum displacement volume immediately prior to the starting process of the internal combustion engine 2, or a setting of the displacement volume control device 50 of the power unit 7 to the maximum displacement volume at the beginning of the starting process of the internal combustion engine 7, is therefore unnecessary, so that the starting process of the internal combustion engine with the power unit 7 of the invention occurs in a brief period of time in a start-stop function.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A hydrostatic power unit, comprising:

a variable displacement machine with a continuously variable displacement volume, wherein the variable displacement machine is operable as a pump and a motor and is in a drive connection with an internal combustion engine, wherein the power unit operated as a pump sucks hydraulic fluid via a suction side from a tank and delivers into a delivery line that leads to at least one consumer, and wherein the power unit operated as a motor is a hydraulic starter to start the internal combustion engine, wherein hydraulic fluid from a hydraulic accumulator is supplied to the suction side of the power unit operated as a motor, wherein the power unit includes a spring device configured such that when the internal combustion engine is shut off, a displacement volume control device that controls the displacement volume of the power unit is actuated into a position with a maximum displacement volume, such that when the suction side of the power unit receives hydraulic fluid from the hydraulic accumulator, the internal combustion engine is started by the power unit operating as a motor without a need for an immediately preceding separate adjustment of the displacement volume control device of the power unit, wherein the spring device is engaged on an actuator piston device of the power unit, which is in an operative connection with the displacement volume control device, and wherein the actuator piston device is actuated by a control valve with a control pressure, wherein when the internal combustion engine is shut off, the control pressure is removed from the actuator piston device.

2. The hydrostatic power unit as recited in claim 1, wherein the power unit is a unilaterally variable displacement power unit and the displacement volume control device of the power unit is variable starting from a position with a minimum displacement volume in one displacement direction.

3. The hydrostatic power unit as recited in claim 1, wherein the consumer comprises a working hydraulics system and the power unit, when operated as a pump, supplies the working hydraulics system with hydraulic fluid.

4. The hydrostatic power unit as recited in claim 1, wherein the power unit is an axial piston machine having a swashplate construction.

5. A drive train of a mobile machine, comprising:

a hydrostatic power unit driven by an internal combustion engine as recited in claim 1, wherein the power unit, when operated as a motor, forms a hydraulic starter for the internal combustion engine and when operated as a pump supplies a working hydraulics of the machine with hydraulic fluid.

* * * * *